United States Patent
Levine et al.

(10) Patent No.: US 6,636,015 B1
(45) Date of Patent: Oct. 21, 2003

(54) WATERTIGHT PORTABLE AUXILIARY POWER SOURCE

(75) Inventors: Stephen Levine, Far Hills, NJ (US); Jonathan Levine, Far Hills, NJ (US)

(73) Assignee: Team Products International Inc., Parsippany, NJ (US)

( * ) Notice: Subject to any disclaimer, the term of this patent is extended or adjusted under 35 U.S.C. 154(b) by 0 days.

(21) Appl. No.: 10/143,210

(22) Filed: May 9, 2002

(51) Int. Cl.$^7$ ................................................ H02J 7/00
(52) U.S. Cl. ........................................ 320/105; 320/104
(58) Field of Search ............................. 320/105, 104, 320/106, 107, 112; 307/64, 66; 429/170

(56) References Cited

U.S. PATENT DOCUMENTS

| | | | | |
|---|---|---|---|---|
| 4,983,473 A | * | 1/1991 | Smith ........................... | 429/48 |
| 5,367,243 A | * | 11/1994 | Wells et al. ................. | 320/105 |
| 5,633,623 A | * | 5/1997 | Campman ................... | 340/321 |
| 5,754,029 A | * | 5/1998 | Mann et al. ................. | 320/106 |
| 5,793,185 A | * | 8/1998 | Prelec et al. ................ | 320/104 |
| 5,982,138 A | * | 11/1999 | Krieger ....................... | 320/105 |
| 6,002,235 A | * | 12/1999 | Clore ........................... | 320/105 |
| 6,222,342 B1 | * | 4/2001 | Eggert et al. ............... | 320/105 |
| 6,394,040 B1 | * | 5/2002 | Axel ............................ | 119/859 |

* cited by examiner

*Primary Examiner*—Lawrence Luk
(74) *Attorney, Agent, or Firm*—Darby & Darby

(57) ABSTRACT

A portable auxiliary power source includes a clamshell-type housing including a top section or cover and a bottom section hingedly connected together. The housing provides a watertight chamber which fully encloses all internal components. Disposed within the housing are a battery, a pair of charging cables, and a pair of charging clamps. Also disposed within the housing is a control panel which includes a work light, battery charge status indicators, a charge status button, battery monitoring circuitry, an on/off switch. Further the control panel may include a 12 volt charging port, an AC charging port, and a 12 volt DC socket. The control panel provides a storage tray for storage of the charging cables and charging clamps.

21 Claims, 5 Drawing Sheets

WATERTIGHT PORTABLE AUXILIARY POWER SOURCE

BACKGROUND OF THE INVENTION

This invention relates to the field of auxiliary power sources and, more particularly, to portable auxiliary power sources which may be used to start various machines with disabled batteries.

One common application for portable auxiliary power sources is to "jump-start" vehicles, such as automobiles and boats, which have disabled batteries. A jump-start procedure requires positioning a vehicle with a charged battery adjacent to a vehicle with a discharged battery, and connecting both batteries via cables with battery clamps at each end to allow the disabled vehicle to be started. This procedure suffers from several limitations, such as the requirement that a "rescue" vehicle be available, and that both vehicles be positioned closely together to permit the jump-start.

To alleviate these drawbacks, many portable auxiliary power sources have been developed and are well known in the art. U.S. Pat. No. 6,002,235 to Clore discloses a portable battery jump starter which comprises a housing equipped with a battery having jumper cables connecting the battery and battery clamps. In this unit the jumper cables and clamps are stored externally on the sides of the housing when not in use. U.S. Pat. No. 6,222,342 B1 to Eggert et. al. discloses a portable battery jump starter which includes a plastic, clamshell-type housing enclosing much of the recharging componentry. However, this design also provides for external storage of the cables and clamps.

External storage of the cables and clamps leaves these components exposed and unprotected, thus creating a risk of damage and raising other safety issues related to the electrical nature of these devices. Thus, while these prior devices address the problems inherent in jump-starting, they create new issues of durability and safety. It is therefore an object of this invention to provide an improved portable auxiliary power source which provides greater durability and safety.

SUMMARY OF THE INVENTION

The present invention is directed to a portable auxiliary power source that encases all components within a rigid, watertight housing, dramatically reducing the potential for damage and safety risks.

In an illustrative embodiment of the invention, the auxiliary power source includes a clamshell-type housing having a bottom section and a closeable top section which are connected via a hinge. The housing is secured in a closed position by dual locking latches, and a handle is provided for portability. The housing defines a chamber which fully encloses all components of the invention. As a result, the risk of damage to exposed components is eliminated. The housing further includes a watertight seal located along the joint between bottom and top sections. As a consequence, all of the internal components are shielded from water penetration when the housing is in the closed position. This prevents corrosion of metal parts during storage, such as the recharging cables and clamps.

A battery is stored in the bottom section of the housing. The battery includes a plurality of voltage cells and has a positive and a negative terminal. A pair of recharging cables is also provided. The proximal ends of the cables are connected to corresponding terminals of the battery, while the distal ends are connected to the cable clamps. These clamps are used to electrically connect the power source of the present invention with a discharged battery, and to deliver an electrical charge to that discharged battery.

A control panel is mounted above the bottom section of the housing and includes a storage tray, a work light, charge status indicator lights, a 12 volt DC power accessory receptacle/recharging socket to recharge the battery, a 12 volt charging port, an AC charging port, a printed circuit board, and an on-off switch. The cables and the clamps are stored in the storage tray and are removably secured by clamp covers and velcro straps to prevent damage from movement. A printed circuit board is mounted underneath the control panel and supports the circuitry that controls operation of the device.

BRIEF DESCRIPTION OF THE DRAWINGS

The foregoing and other features of the present invention will be more readily apparent from the following detailed description and drawings of illustrative embodiments of the invention in which.

DESCRIPTION OF ILLUSTRATIVE EXEMPLARY EMBODIMENTS

Figure 1:
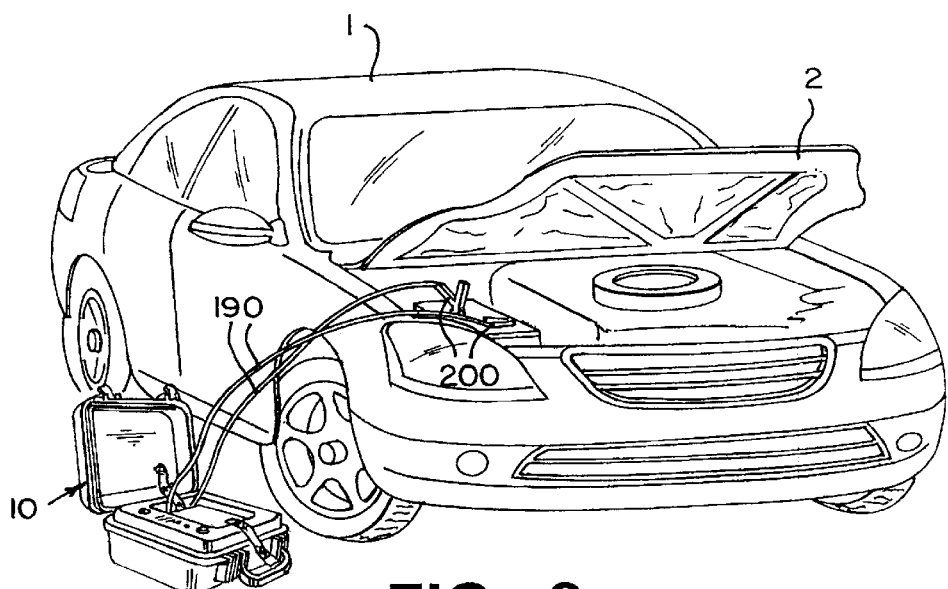
FIG. 1 is an illustration showing a possible application of the device, i.e. to jump start a discharged battery in a motor vehicle.

In FIG. 1, there is shown a motor vehicle or car 1 which has an ignition system normally powered by a battery 3. As is well known, if the battery 3 becomes incapable of starting the motor, a temporary solution is to jump-start the motor by placing another power source in parallel with the battery 3. This is typically performed by opening the hood 2 of the car to expose the battery 3. Then a pair of jumper cables are connected between the battery 3 and the other power source, e.g. the battery in another motor vehicle.

According to the present invention, instead of using the battery of another motor vehicle to perform a jump start, the car 1 is jump started with a portable auxiliary power source 10 which has its own attached jumper cables 190. These cables may be made with 4 AWG wire to handle the large amounts of current needed to drive the starter motor of the vehicle. Clamps 200 at the distal ends of cables 190 may be attached directly to the terminals of the battery 3. Preferably, the clamps are rated at 400 amps and are color coded to match the battery terminal to which they should be connected, e.g. red for positive and black for ground. While not necessary, the pair of cables may be similarly color coded. Also, contact guards 205 (FIG. 3), which may be color coded, can be provided to prevent or reduce the effects of sparking during connection to the battery or due to accidental contact with the wrong terminal or ground.

Figure 2:
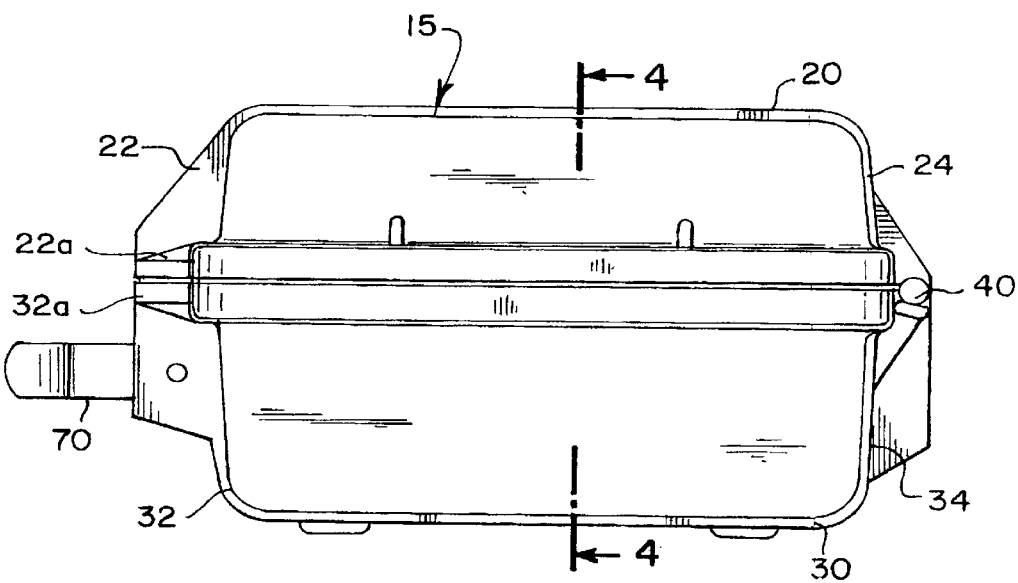
FIG. 2 is a side view of the preferred embodiment of the portable of the portable auxiliary storage in a closed position.
Figure 3:
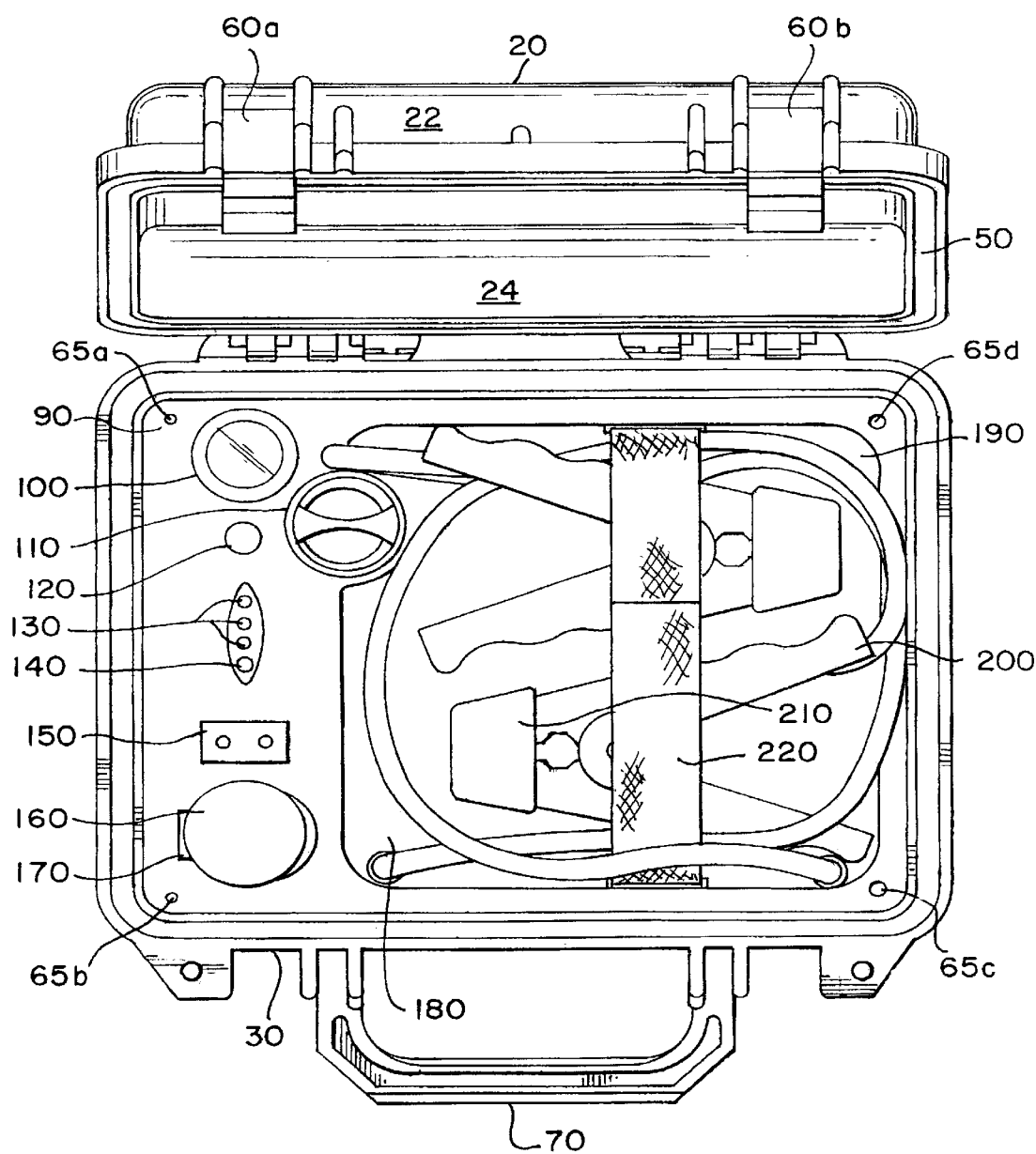
FIG. 3 is a plan view of the preferred embodiment in an open position.
Figure 4:
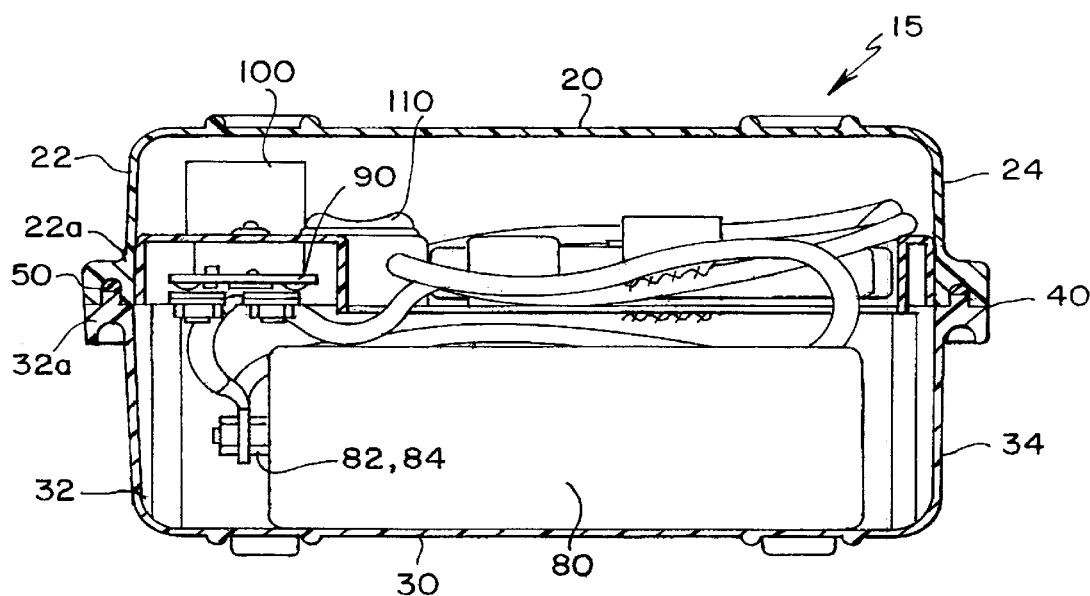
FIG. 4 is a cross sectional view along lines 4—4 of FIG. 2 showing the internal components of the preferred embodiment in a closed position; and further showing the work light in a pop-up position.

Referring now to FIGS. 2–4, the portable auxiliary power source 10 includes a clamshell shaped housing 15 with a top cover 20 and a bottom section 30 that are connected to each other by hinge connectors 40 so the housing can be opened and closed. At least one of the mating edges of the top cover and bottom section are provided with a watertight seal 50. All of the components of the auxiliary power source including the battery, the pair of cables and the cable clamps can be completely enclosed in the housing when it is closed so that the unit is self contained and watertight.

Figure 5:
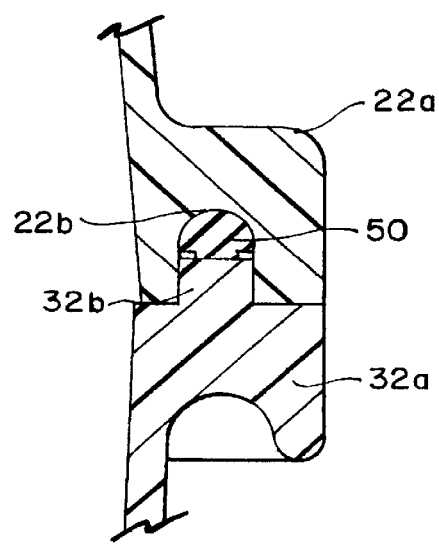
FIG. 5 is an enlarged cross section view illustrating the watertight seal of the preferred embodiment.

Housing 15 may be constructed of a rigid material such as plastic, rubber, metal or other suitable materials. It may have reflective tape on the exterior to assist in illuminating a user operating the unit along the side of a road at night. Top cover 20 includes a front wall 22 and a rear wall 24, and bottom section 30 includes a front wall 32 and a rear wall 34. The lower portion of the top cover front wall 22 has flange 22a, which tightly mates with a flange 32a on the upper portion of the bottom section of front wall 32 to form a closed position (FIG. 5). Flange 22a has a recess 22b that receives seal 50 (FIGS. 3 and 5) which creates a watertight seal with a projection 32b on flange 32a when the housing is in a closed position. The seal may be made of rubber or other flexible material capable of forming a watertight seal. Latches 60a and 60b are provided on the top cover front wall 22 for engagement with respective keepers on base front wall 32 to secure the housing in a closed and water sealed position.

Four elongated tubular support members 65a–d extend vertically upwards from base 30 to position and support a control panel 90 (described more fully below). The radially inside portion of top ends of tubular support members 65a–d contain threads to receive a corresponding screw which rigidly secures control panel 90 to the housing.

A handle 70 is pivotally mounted on the front wall of the base to facilitate portability. Non-slip feet, e.g. made of rubber, may be provided under the bottom to keep the unit from slipping when placed on the ground.

A battery 80 is disposed in the base of the bottom section 30 of housing 15 in the region underneath control panel 90. The battery 80 includes positive and negative terminals 82 and by 84, respectively.

As shown in FIG. 3, the control panel 90 includes a a work light 100, an on-off switch 110, a battery charge status button 120, LED charging indicators 130, 12 volt DC low power supply socket 140, an AC charging port 150, a 12 volt DC power accessory receptacle 160 with an end cap 170, and a chamber used as a storage tray 180. Cables 190 and clamps 200 are stored in storage tray 180. Clamp covers 210 and velcro straps 220 removably secure the cables and clamps when the auxiliary power source is not in use.

On-off switch 110 allows the power from battery 80 to be applied to or removed from the cables 190 as a further safety measure. The LED charging indicators 130 are an indication of the charge on internal battery 80. If the battery is rechargeable, it will indicate the status of the recharging process when depressing battery charge button 120.

The DC power accessory receptacle 160 may be a 12 volt DC cigarette lighter-type socket 160. Also, battery 80 may be of the rechargeable type. In such a case, a recharging unit (not shown) can be provided with an output plug which fits into socket 160 so that it can be used to recharge battery 80 without removing the control panel from the housing. Further, a pair of heavy duty cables may be provided with cigarette lighter plugs on each end, one end can be plugged into socket 160 and the opposite end can be plugged into the cigarette lighter of a car with a disabled battery. In this way the battery of the portable unit is placed in parallel with the battery of the vehicle without having to open the hood 2 of the vehicle or remove the cables from the housing. The power is supplied from battery 80 through socket 160 and the lighter plug cable to the cigarette lighter socket of the vehicle and then to its battery.

FIG. 4 is a cross-sectional view along lines 4—4 of FIG. 2 showing the auxiliary power source 10 in a closed position. This is the preferred position when the unit is not in use. In this position, all components of the invention are completely encased within housing 15. This reduces the potential for damage to any internal components by eliminating their exposure to the outside, which is a common problem in the art. Further, seal 50 (see FIGS. 3 and 5) eliminates any possibility of water seepage into the housing 15 when it is in the closed position.

As shown in FIG. 4, the work light 100 may be a pop-up unit built into the on-off switch 110 itself. When the switch is turned from off to on, the spring loaded work light pops up along with the switch. To turn off the work light and the power to the cables, the work light is pushed down into the receptacle. The work light may be an incandescent or krypton work light. Also shown is a circuit board 95 which is mounted to the underside of control panel 90. This circuit board may contain electrical and electronic components that control charging of the battery 80 and the charge indicator LEDs 130. When the battery is recharged with a DC voltage source through the receptacle 160, the circuit limits the charging current. However, when it is recharged with an AC source through receptacle 150, the circuit includes a rectifier to convert the AC to DC, and also a current limiting device.

In addition to use as a jump starter, auxiliary power source 10 can also be used as a low power source, e.g. 12 volt DC, for other devices, such as cellular phones, radios, and other automotive devices. These devices can be operated by inserting one end of a DC power cord into the socket 140 (FIG. 3) and the other end into a 12 volt DC power socket of the device to be operated. Socket 160 is a high power output and can be used to connect power source 10 to a separate power inverter (not shown). Thus the DC voltage from socket 160 can be converted into 110 volt, 60 Hz AC voltage by the inverter for operation of a number of other appliances that require AC voltage, e.g. a TV or VCR.

Figure 6:
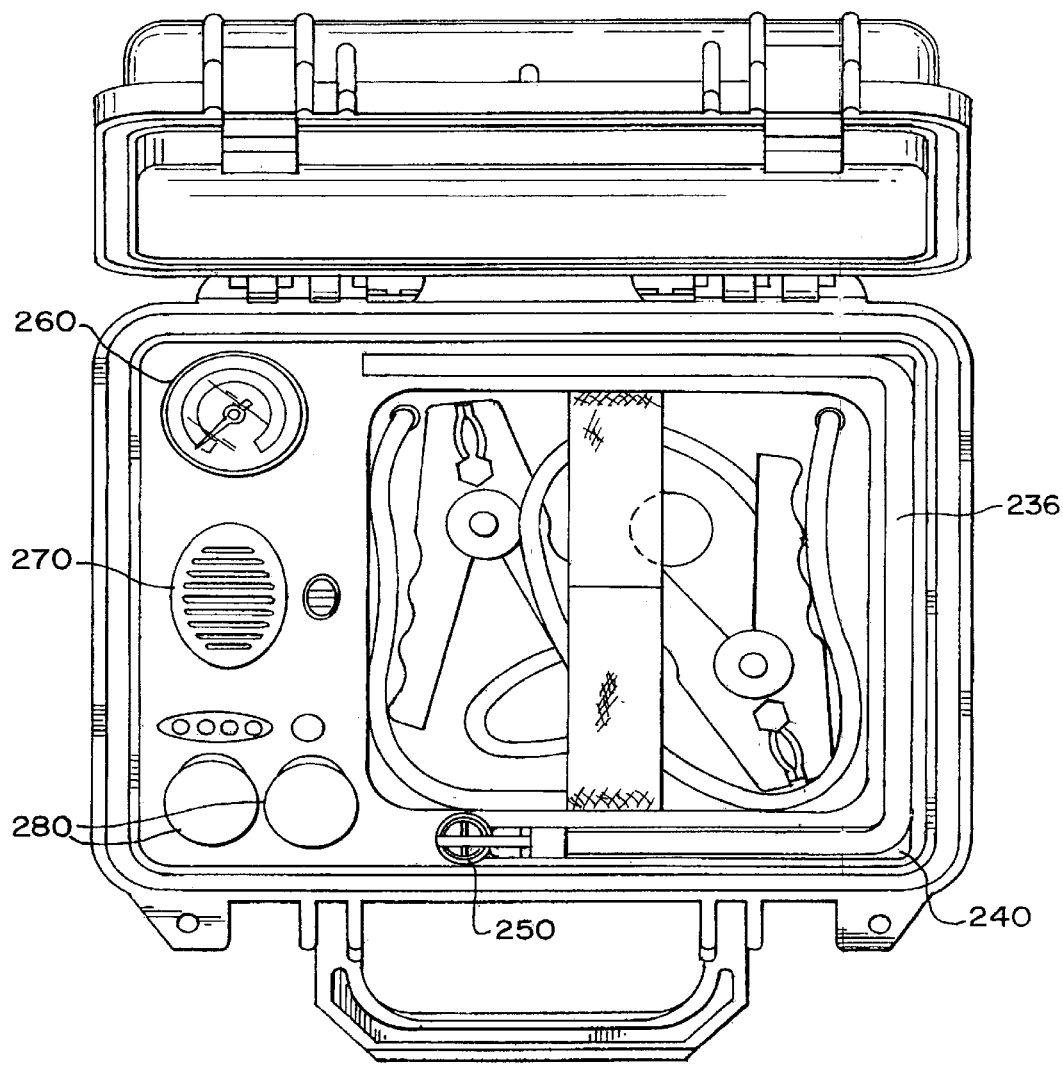
FIG. 6 is a perspective view of an alternative embodiment of the invention in an open position showing an air compressor/inflator hose and air pressure gauge.

In an alternate embodiment, a built-in compressor/inflator be included in the housing for inflating tires on a vehicle. As shown in FIG. 6, an air compressor hose 230 leading from the air compressor is stored in a circumferential channel 240 formed in the top of the control panel 90. The air compressor is disposed below the control panel in the bottom section of the housing. The proximal end of the hose is connected to an air delivery nozzle 250 for delivery of air to an air intake valve of a tire. An air pressure gauge 260 may be disposed in the control panel to indicate the air pressure of a tire. The device also includes an air vent 270 disposed in the control panel to dissipate heat generated by the air compressor. The unit may further include dual DC power sockets 280.

In a further alternate embodiment, DC output sockets may be provided on the exterior of the case. To maintain the water seal, these sockets may be covered with watertight caps.

Figure 7:
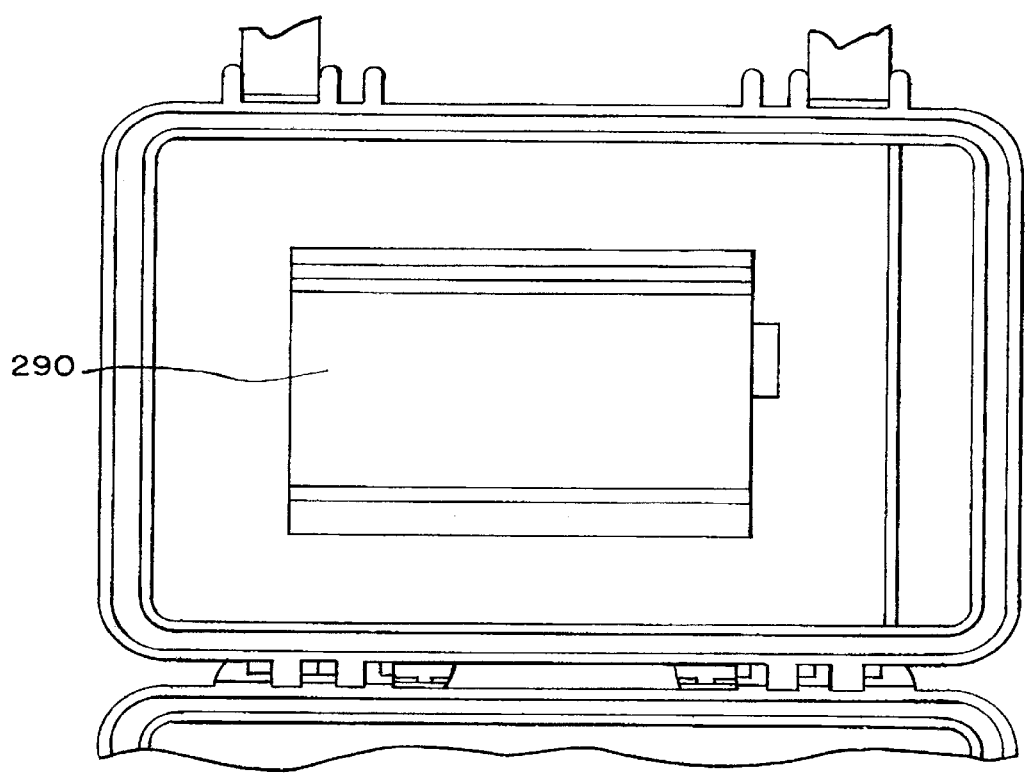
FIG. 7 is a perspective view of a further alternative embodiment showing a power inverter.

As shown in FIG. 7, a further embodiment may also be provided with a DC to AC power inverter 290, which is removably attached to the inside of the top cover 20 of housing 15, such that it may be stored in the housing or removed for remote use.

While the invention has been particularly shown and described with reference to preferred embodiments thereof, it will be understood by those skilled in the art that various changes in form and details may be made therein without departing from the spirit and scope of the invention.

We claim:

1. A portable auxiliary power source for augmenting a battery used to start a motor comprising:

a housing having a base and cover connected together so that they can move between open and closed positions of the housing, said housing defining a chamber;

a battery disposed in said chamber;

a watertight seal whereby said housing becomes impervious to water inflow when closed;

a pair of cables having proximal and distal ends, the proximal ends being connected to said battery;

a pair of clamp connectors respectively connected to the distal ends of said cables; said battery, pair of cables and clamp connectors being arranged such that they can be located completely within the housing when it is in the closed position;

a control panel positioned in said chamber above the battery; and a storage tray for storing said cables and clamps when not in use, said storage tray being located in the control panel, and an opening being provided in the tray so that access is provided for the battery cable to extend to the battery below the control panel.

2. The power source of claim 1 wherein said control panel includes indicator lights for communicating charging status of said battery, a charging status button, and a power accessory receptacle through which said battery may be recharged with DC voltage.

3. The power source of claim 2, wherein the battery is rechargeable, the battery can be recharged by a power source applied to the power accessory receptacle, and the control panel indicator lights indicate the status of the recharging.

4. The power source of claim 1, wherein said control panel is mounted to said base via elongated tubular support members.

5. The power source of claim 1, wherein said watertight seal is located along at least one of the edges where said base and cover come together when the housing is in the closed position.

6. The power source of claim 5 wherein said base has an upper edge and said cover has a lower edge, at least one of said edges receives a rubber gasket which forms said watertight seal which prevents water from penetrating the housing when the unit is in a closed position.

7. The power source of claim 1, wherein said housing is a clamshell-type housing formed from one of plastics, rubber and metal, wherein said base and said cover are connected together by at least one hinge.

8. The power source of claim 1, further including a releasably engageable latch structure is used to secure said housing in the closed position.

9. The power source of claim 1, further comprising a handle disposed on the base.

10. The power source of claim 1, further comprising monitoring circuitry including a printed-circuit board connected to said battery and a circuit for monitoring the status of the charge of the battery.

11. The power source of claim 1, further comprising reflective strips on the exterior of the housing.

12. The power source of claim 1, further comprising non-slip feet on the exterior of the bottom portion.

13. The power source of claim 1 wherein said control panel includes an on-off switch which controls the application of voltage from the battery to the cables.

14. The power source of claim 1 wherein said control panel includes a work light.

15. The power source of claim 1 further including power outlet sockets covered by watertight caps on the exterior of the housing.

16. The power source of claim 1 further including an AC to DC power inverter.

17. The power source of claim 16 wherein the inverter is releasably mounted to the cover of said housing.

18. The power source of claim 1 wherein said source includes a circuit and said control panel includes an AC charging port, said circuit includes a rectifier for converting the AC voltage to DC voltage for use in charging the battery.

19. The power source of claim 1 wherein said control panel includes a DC voltage output port.

20. A portable auxiliary power source for augmenting a battery used to start a motor comprising:

a housing having a base and cover connected together so that they can move between open and closed positions of the housing, said housing defining a chamber;

a battery disposed in said chamber;

a pair of cables having proximal and distal ends, the proximal ends being connected to said battery;

a pair of clamp connectors respectively connected to the distal ends of said cables; said battery, pair of cables and clamp connectors being arranged such that they can be located completely within the housing when it is in the closed position; and an air compressor, an air compressor hose, and an air delivery nozzle.

21. The power source of claim 20 wherein said source includes a control panel in which an air pressure gauge for said air compressor is mounted.

* * * * *